March 2, 1965 J. C. McALVAY 3,171,247
MOTOR VEHICLE AND HYDRAULIC SYSTEM
Filed May 24, 1962 2 Sheets-Sheet 1

INVENTOR
JOHN C. McALVAY

ATTORNEYS

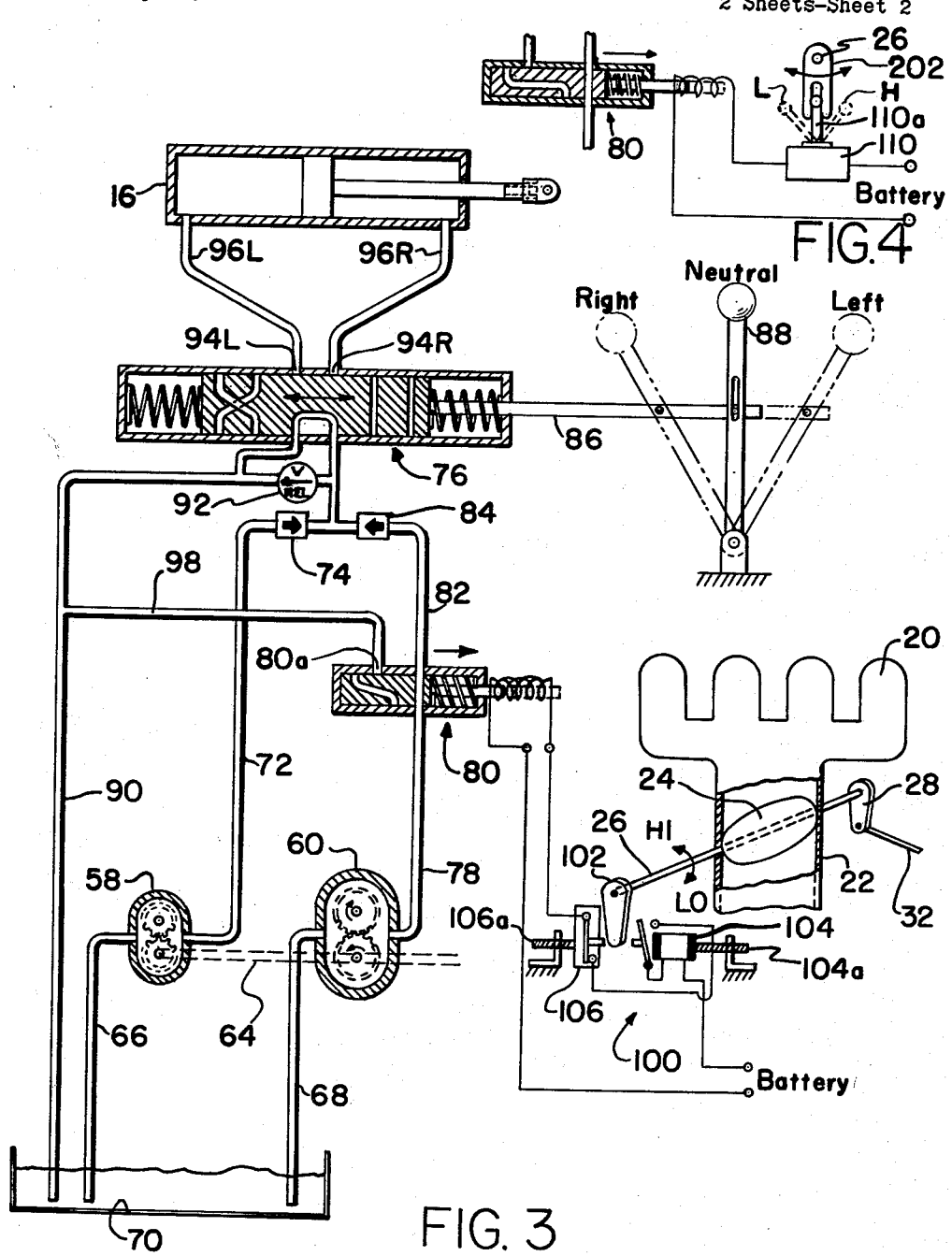

United States Patent Office 3,171,247
Patented Mar. 2, 1965

3,171,247
MOTOR VEHICLE AND HYDRAULIC SYSTEM
John C. McAlvay, Racine, Wis., assignor to Webster Electric Company, Racine, Wis., a corporation of Delaware
Filed May 24, 1962, Ser. No. 197,483
6 Claims. (Cl. 60—19)

This invention relates to a motor vehicle and its hydraulic system and more particularly it delates to a motor vehicle driven by an internal combustion engine having a hydraulic system which automatically unloads a portion of the hydraulic load on the engine at a predetermined level to prevent engine stall when high total loads are impressed on the engine.

It has been the practice in vehicles such as tractors and the like having hydraulic systems for operating blades or buckets on the vehicle to provide automatic means for unloading or partially unloading the hydraulic system when high hydraulic loads are encountered to prevent stalling of the engines. These systems were, however, responsive only to the hydraulic loads on the engine rather than to the total load on the engine which includes the hydraulic load as well as tractive loads, etc. Consequently, these systems were sometimes ineffective to prevent engine stalling when high tractive loads were encountered while the hydraulic load was below the unloading level.

Therefore, it is an obpect of the present invention to provide a new and improved tractor or motor vehicle having a hydraulic system for operating various components on the vehicle such as a blade or bucket, etc., in which the hydraulic system is partially or fully unloaded in response to the total load on the engine to prevent engine stalling when high tractive loads and relatively low hydraulic loads are encountered.

Another object of the present invention is to provide a new and improved vehicle and hydraulic system as described in the preceding paragraph which is relatively low in cost, simple in construction and operation and which is effective to prevent engine overloading under various combinations of hydraulic and tractive loads.

Another object of the present invention is to provide a new and improved hydraulic system for use with a conventional tractor or vehicle in which the hydraulic system is unloaded in response to the total load on the vehicle automatically when the engine load reaches a predetermined first level and then reapplies the hydraulic load to the engine automatically when the total engine load reaches a lower second predetermined level.

Another object of the present invention is to provide a new and improved hydraulic system as described in the preceding paragraph which can be easily and simply installed on a conventional tractor or vehicle having a hydraulic system and a conventional throttle governed speed control.

Briefly, the forgoing and other objects of the present invention are accomplished by providing a tractor or other vehicle driven by an internal combustion engine having a governor for controlling the throttle valve of the engine in response to the load thereon and having an engine driven hydraulic fluid pump. The output of the pump is connected through relief bypass means to the various valves of a hydraulic system for operating various hydraulic appliances such as cylinders, motor, etc. on the vehicle. The throttle control of the engine is provided with operating means which actuate the reief bypass means at a predetermined throttle position to bypass the hydraulic fluid from the pump directly back to a reservoir. The relief bypass means is maintained by the operating means in the bypass position until the throttle control reaches a second predetermined lower throttle position when the hydraulic load is again picked up by the engine.

Further objects and advantages of the present invention will become apparent from the following detailed description when taken in conjunction with the drawings, in which:

FIG. 3 is an enlarged schematic diagram of a hydraulic system and tractor governing system as characterized by the features of the present invention; and FIG. 4 is a schematic diagram of another embodiment of switch means utilized on the present invention.

Figure 1:
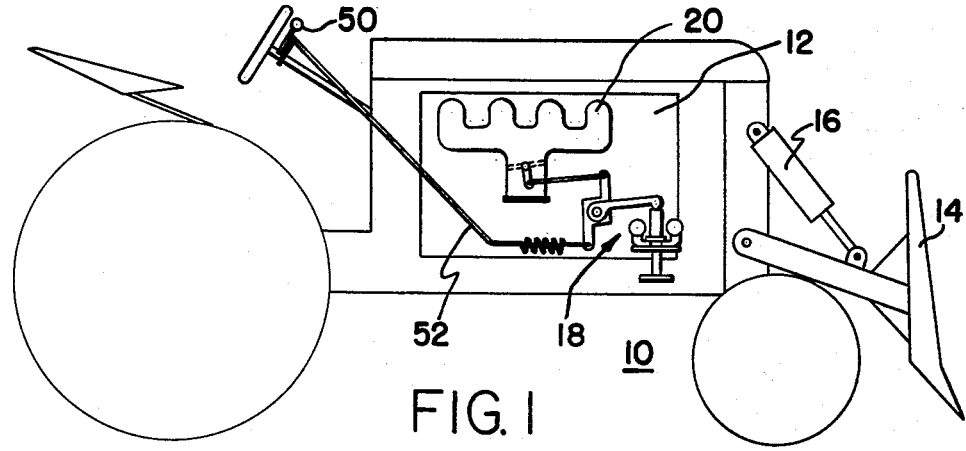
FIG. 1 is a side elevational view of a tractor having a throttle governing system.

Referring now to the drawings there is illustrated in FIG. 1 a tractor or other motor vehicle 10 of the conventional type being powered by an internal combustion engine 12. The tractor may be provided with a blade 14 or other components which are operated by a hydraulic cylinder 16 or other hydraulic apparatus. The tractor is provided with a conventional speed governing system 18 which is illustrated in enlarged schematic form in FIG. 2 for a clearer understanding of the operation of the system.

It is to be understood that the illustrated governor system is only a typical system and the present invention is not limited in application to the tractor and governing system described but is equally applicable to various types of internal combustion engine powered vehicles having governor systems for maintaining and controlling the speed of the vehicle through a throttle control or fuel control valve on the engine. Likewise, it is to be understood that the present invention is not limited to vehicles powered by gasoline engines but is equally applicable to diesel engine and turbines which have some type of throttle or fuel control governing system for controlling and maintaining the speed of the engine.

Figure 2:
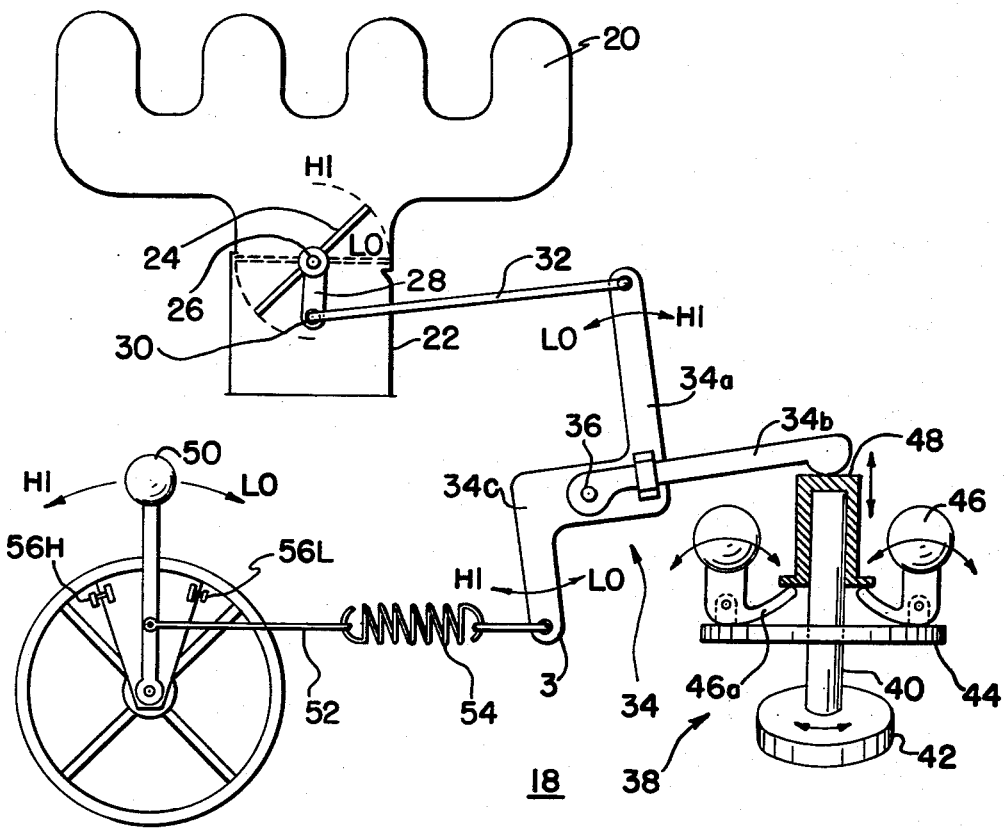
FIG. 2 is an enlarged schematic diagram of the throttle governing system of the tractor of FIG. 1.

Referring to FIGS. 1, 2 and 3, the engine 12 is provided with a fuel metering and distribution system which includes an intake manifold 20 for providing the cylinders of the engine with an air fuel mixture or in the case of a diesel or turbine engine a fuel manifold for providing the engine with fuel. Connected to the manifold 20 is a throat 22 having pivotally mounted therein a throttle valve 24 movable between an open and close position around the axle or pin 26. Again it is to be understood that in a diesel or turbine engine the fuel control means would have the same function as the throttle valve 24 in metering fuel to the engine in proper amounts.

The throttle pin 26 is provided with a lever or toggle 28 which is pivotally connected by a pin 30 to one end of an actuating rod 32. Movement of the rod 32 to the left tends to close the throttle valve 24 and thus reduce the fuel flow to the engine while movement of the rod 32 to the right tends to open the valve 24 increasing the fuel flow to the engine.

The other end of the actuating rod 32 is pivotally connected to an arm 34a of a bell crank 34 which is pivotally mounted to the engine block or tractor frame by a pin 36. The bell crank 34 is also provided with a governor arm 34b which is in engagement with an engine driven centrifugal governor 38. The governor 38 is provided with a shaft 40 which is driven by the engine crankshaft through means such as a gear 42. A swash plate 44 is provided to rotate with the shaft 40 and to pivotally support the governor weights 46. The weights 46 are provided with arms 46a which engage the lower flange of an inverted cup member 48 which is slidably mounted on the shaft 40. The outer end of the governor arm 34b rests on the upper end of the member 48 so that as engine speed increases and centrifugal force causes the weights 46 to move outward, the member 48 rises causing the arm 34b to pivot in a counterclockwise direction thus tending to close the throttle valve 24 to return the engine speed to normal.

The bell crank 34 is provided with a lower arm 34c which is connected to a governor control handle 50 mounted on the steering wheel of the tractor or any other location convenient to the operator. The handle 50 is connected to the outer end of the arm 36c through a rod 52 and governor spring 54. Adjustable upper and lower limit stops 56H and 56L are provided adjacent the handle 50 to limit the movement of the handle and thereby provide maximum and minimum governed speed limits for the engine.

In operation, when a high governed speed is desired, the handle is set at a position toward the left in FIG. 2 thus increasing the tension on the spring 54 causing the throttle valve 24 to open and allow the engine speed to pick up. This causes the weights 46 to move outwardly tending to move the arm 34b upward until the counterclockwise moment on the bell crank 34 is balanced by the clockwise moment on the bell crank 34 caused by the governor spring 54. When this equilibrium is obtained the engine is at the governed speed as determined by the setting of the handle 50. Should the load on the engine be increased causing a drop in engine r.p.m., the counterclockwise moment on the bell crank will decrease due to the loss of centrifugal force on the weights 46 and the governor spring will urge the throttle valve to a more open position thus allowing more fuel for the engine to gradually bring up the engine speed to the proper level. Should the engine load decrease, the engine r.p.m. will tend to speed up increasing the centrifugal force on the weights 46 and overcoming the clockwise moment on the bell crank 34 caused by the governor spring 54 thus reducing the throttle valve opening and metering less fuel to the engine to bring the speed down to normal. Thus, the throttle governor system provides a means for keeping the engine speed constant as different loads are imposed on the engine for any given setting of the handle 50 within a range of handle settings between the stop limits 56H and 56L. Of course, if the load increase is of such magnitude that the throttle valve is opened to the fully open position and still will not bring the engine speed up to the desired speed the engine will either stall or continue to run at a lower speed causing very high cylinder pressure to develop which may damage the engine. In this instance, the only solution is to reduce the load in order to allow the engine to speed up until it develops more horsepower to handle the load.

In some tractors having hydraulic systems provision is made for reducing the hydraulic load in response to increased back pressure of the hydraulic system. These types of systems are dependent only on hydraulic load and it is possible to stall these engines because of a greatly increased tractive load such as encountered when going up hill or encountering added resistance to movement of a blade, because the total load (i.e. tractive and hydraulic) exceeds the engine power limitation. In this situation the hydraulic load may be small as compared with the tractive load and since the system is sensitive only to hydraulic horsepower the hydraulic load is not reduced. In many such cases if the hydraulic load were reduced or eliminated this would result in relieving sufficient engine load to permit normal tractive function without approaching the stalling point of the engine.

In the present invention provision is made to do this, by providing a hydraulic system as illustrated in FIG. 3 for use with the tractor and governing system just described. The hydraulic system is provided with a pair of engine driven hydraulic pumps 58 and 60. These pumps can be connected to a common engine driven shaft 64 or they can be combined as a single casing dual-section pump. The pump 58 is preferably smaller in capacity than the pump 60 and the inlets of both pumps are connected through the conduits 66 and 68 to a common fluid reservoir 70. The outlet or pressure side of the pump 58 is connected through the conduit 72 and check valve 74 to the inlet port of a control valve 76. The outlet of the pump 60 is connected through a conduit 78 to the inlet side of a solenoid operated dump valve 80. The valve 80 is shown in a position in FIG. 3 with the solenoid coil thereon not energized and in this position, fluid from the conduit 78 passes through the valve 80, the conduit 82 and check valve 84 to the inlet port of the valve 76. Thus, when the valve 80 is in the position shown in FIG. 3 fluid under pressure from both pumps is available at the inlet of the valve 76. The valve 76 is spring loaded to the neutral position as shown and is connected via a rod 86 to an operating handle 88 which is positioned on the tractor at a place convenient to the operator.

The valve 76 is provided with a return port which is connected to a return line 90 leading back to the reservoir 70. A relief valve 92 is connected between the conduit to the inlet port of the valve 76 and the return line 90. The valve 76 is also provided with a left outlet port 94L and a right outlet port 94R. These ports are connected to the left and right sides of the cylinder 16 through the conduits 96L and 96R in order that fluid pressure may be directed to either side of the cylinder 16 to lift or lower the blade 14 or operate other apparatus. When the handle 88 is moved to the right position fluid is directed to the right hand side of the cylinder 16 and the left hand side is connected to the return line 90. When the handle is released the left hand spring in the valve 76 returns it to neutral. If the handle is in a position other than neutral when the piston in the cylinder reaches the end of its stroke or if the output of fluid from the pump or pumps is greater than that required to move the cylinder, the valve 92 bypasses some of the excess fluid directly to the return line 90 to avoid a high pressure build up in the line.

The solenoid dump valve 80 is provided with a dump outlet 80a which is connected to the return line 90 through the conduit 98. If energizing current is supplied to the coil of the solenoid valve 80, the valve plunger moves to the right compressing the spring and interconnecting the conduit 78 to the return line, thus bypassing the output of the pump 60 and reducing the hydraulic load on the engine. When the solenoid coil is deenergized the valve spring returns the valve plunger to the position shown in FIG. 3 and the pump 60 then supplies fluid to the valve 76 for operation of the various hydraulic apparatus on the tractor. It is to be understood that the pump 58 could be eliminated altogether from the system and then the entire hydraulic load on the engine would be eliminated when the solenoid valve 80 was energized. Further, it is to be understood that a plurality of control valves, cylinders, hydraulic motors, etc. could be supplied from both pumps in separate systems so that certain of the less important in priority appliances would be bypassed when the solenoid dump valve is operated.

The coil of the dump valve 80 is connected to a source of electrical power such as the vehicle battery or generator through a switch system 100. The switch system 100 is actuated by a cam 102 attached to and rotating with the axle pin 26 of the throttle valve 24. As shown in FIGS. 2 and 3, as the throttle valve 24 moves to a more open position to deliver more fuel to the engine, the cam 102 rotates in a counterclockwise direction and as the valve 24 moves toward a more closed position the cam 102 rotates in a clockwise direction. As the cam 102 rotates counterclockwise a predetermined amount it engages an actuating button on a normally open relay 104 to close the contacts on the relay energizing the holding coil of the relay and thus completing the circuit to energize the solenoid valve 80 and dump a portion of the hydraulic load. When this happens, the total load on the engine is reduced by the amount of the hydraulic load carried by the pump 60 and engine stalling is thereby prevented unless the remaining load increases over the engine limit. Since at any given engine speed the horsepower output is approximately proportional to the throttle setting, the throttle setting thus provides a good index of the engine load. The position of the relay 104 relative to the cam 102 can be adjusted by means of an adjusting mounting screw 104a so that the hydraulic load on the pump 60 can be dumped at any desired position of the throttle valve 24. Thus, it is possible to adjust the position of the relay 104 such that the hydraulic load from pump 60 will be dumped at say 75% of the engine power and thus the other load on the engine such as a tractive load can still be increased by 25% before the engine stalls.

In operation, as soon as the load from the pump 60 is dumped, the governor system 18 tends to decrease the opening of throttle valve 24 in the manner previously described. As this happens the cam 102 moves away from the relay 104 which then remains closed because of the holding coil. When the cam 102 moves farther in a clockwise direction after the load is dumped, it strikes a normally closed switch 106 which is wired in series with the relay 104. If the cam moves far enough to open the switch 106, the circuit is then broken and the solenoid valve 80 is deenergized and the hydraulic load from the pump 60 is again picked up by the engine. The switch 106 is adjustably mounted by an adjustable screw 106a to a desired position in relation to the cam 102 so that the position of the throttle valve 24 necessary to open the switch can be adjusted and set as desired. For instance, if the relay 104 is positioned so that the load from the pump 60 will be dumped at 75% of engine power, the switch 106 may be positioned so that the load will not be picked up again until the engine power is down to, say 50%. If the load of the pump 60 was, for instance, 15% of the total load on the engine, when the engine reached a total load of 75% the pump 60 load would be dumped, thus reducing the total on the engine to 60%. If this remaining load continues to rise, it can increase up to 100% of the total rated power of the engine for the given r.p.m. before the engine will stall. However, if the load remaining on the engine dropped to 50% then the load of pump 60 will be picked up by the engine, thus increasing the load to 65% with another 10% of increase necessary before the load of pump 60 is dumped. In this manner, the system prevents hunting or rapid pick up and dumping in succession of the pump load during minor variations of the total load on the engine in the region near the dumping level.

It is to be understood that when speaking of engine power and percentage of power in the preceding paragraph, these terms are meant to be related for a constant governed speed of the engine. Since the horsepower of an engine is proportional to the product of the speed and the cylinder pressure, at constant speed the horsepower would be proportional to the cylinder pressure alone and this is approximately proportional to the throttle setting. Thus, at one speed the throttle setting necessary to produce 50% of the available engine power at that speed is approximately the same as the setting required to produce 50% of available power at another given speed. Consequently, when the handle 50 is set for low speed operation, a given percentage variation in load up or down will require roughly the same amount of movement of the throttle valve to keep the speed constant as would be required for variations of the same given percentage at a higher speed setting of the governor. For this reason, the levels at which the hydraulic load from the pump 60 is dumped or picked up will be roughly proportional over a variety of low or high speed settings of the handle 50. Thus, if at a given setting of the handle 50 the total load on the engine is such that the hydraulic load is being dumped, the handle 50 should be moved to a higher speed setting in order that the hydraulic load from the pump 60 can be adequately carried by the engine. Of course, if this increased speed of engine operation is not desired because the speed of the vehicle would be too high it can be compensated for by a shift of gears.

In FIG. 4 there is illustrated schematically another means for energizing the solenoid 80 at a certain predetermined high position of the throttle valve 24 and for maintaining the solenoid energized until the throttle valve 24 drops below a certain predetermined low position. Instead of the relay 104 and switch 106, there is provided in one of the lines between the vehicle power source or battery and the coil of the solenoid valve 80 a snapover switch 110. The switch 110 is of the adjustable hysteresis or differential type and the actuating arm 110a is engaged in a slot of a cam 202 which is positioned on the pin 26 to move with the throttle valve 24. When the cam 202 rotates counterclockwise to move the arm 110a to the high position H, shown in dotted lines, the switch 110 is closed and the solenoid valve 80 is energized dumping the load from the pump 60. The switch 110 remains closed until the arm 110a is moved to the low position L, also shown in dotted lines, before the switch opens and the solenoid valve 80 is deenergized. The switch 110 is adjustable so that the amount of movement to open and close the switch can be set to provide dumping and picking up of the load from the pump 60 at the desired positions of the throttle valve 24. The switch 110 accomplishes the same function as the relay 104 and switch 106 of FIG. 3 and prevents hunting when the power required of the engine is near the dumping level.

Thus, the present invention provides a simple and economical means for preventing engine stalling in a tractor or other vehicle by reducing the hydraulic load on the engine in response to the total load (hydraulic and tractive) on the engine.

While the present invention has been described in connection with the details of a preferred embodiment thereof, it should be understood that such details are not intended to be limitative of the invention except insofar as set forth in the accompanying claims.

What is claimed as new and desired to be secured by Letters Patent of the United States is:

1. In combination, an internal combustion engine, a hydraulic pump driven by said engine, a dump valve connected to the output of said pump, and means responsive to the throttle position of said engine for actuating said dump valve to reduce the load on said engine when said throttle reaches a predetermined position.

2. In combination, with an internal combustion engine having a throttle for controlling the power output of the engine, an hydraulic pump adapted to be driven by the engine, a dump valve connected to the output of said pump and means responsive to a first throttle position of the engine for actuating said dump valve to reduce the load on the engine when the throttle reaches a first position and for keeping the load reduced until the throttle reaches a second lower position.

3. In a motor vehicle powered by an internal combustion engine having a governor for controlling a throttle to maintain constant engine speed and having an engine driven hydraulic pump, a solenoid operated dump valve connected to the output of said pump, switch means actuated by the throttle for actuating said dump valve to reduce the load on the engine when the throttle reaches a first position and maintaining the reduced load until the throttle reaches a second and lower position.

4. In a motor vehicle driven by an internal combustion engine and having a speed governor controlling a throttle valve on said engine for maintaining a constant engine speed, a hydraulic pump driven by said engine, relief means connected to the output of said pump for bypassing hydraulic fluid from said pump and actuating means interconnected to said throttle valve and said relief means for bypassing the fluid from said pump when said throttle valve reaches a predetermined adjustable position.

5. A motor vehicle driven by an internal combustion engine having a speed governor controlling an engine throttle valve for maintaining a constant engine speed, a pair of engine driven hydraulic pumps connected to operate a hydraulic load, solenoid operated dump valve means connected between one of said pumps and said load for bypassing the fluid from said one pump around said load, actuating means interconnected to said dump valve and said throttle valve for actuating said dump valve to bypass the fluid when said throttle valve reaches a predetermined high position and maintaining said fluid bypass until said throttle valve reaches a predetermined low position.

6. A motor vehicle powered by an internal combustion engine and having a speed governor for adjusting a throttle valve on said engine to maintain a constant engine speed, a hydraulic system comprising a pair of engine driven hydraulic pumps for operating hydraulic apparatus, electrically operated relief means connected between the output of one of said pumps and said hydraulic apparatus for bypassing the fluid from said one pump to reduce the load on said engine, an electric system including a source of electrical energy and interconnecting said source to said relief valve and switch means in said system actuated by said throttle valve for actuating said relief valve to bypass said one pump when said throttle valve reaches a predetermined first position and for maintaining said bypass condition until said throttle valve reaches a predetermined lower second position.

References Cited in the file of this patent
UNITED STATES PATENTS

| | | |
|---|---|---|
| 2,326,821 | Boyle | Aug. 17, 1943 |
| 2,618,932 | Taup | Nov. 25, 1952 |
| 2,852,918 | Schwary | Sept. 23, 1958 |
| 3,114,424 | Voreaux et al. | Dec. 17, 1963 |